July 11, 1967  H. O. SPILHAUG  3,330,106
JOINT LINKS FOR CHAINS

Filed Dec. 21, 1964  2 Sheets-Sheet 2

INVENTOR
Helge O. Spilhaug
By Watson, Cole, Grindle & Watson
ATTORNEYS

United States Patent Office 3,330,106
Patented July 11, 1967

3,330,106
JOINT LINKS FOR CHAINS
Helge Odd Spilhaug, Hasleveien 28, Oslo, Norway
Filed Dec. 21, 1964, Ser. No. 419,712
Claims priority, application Norway, Dec. 30, 1963,
151,435
3 Claims. (Cl. 59—85)

ABSTRACT OF THE DISCLOSURE

A link having two separable curved sections of different curve radii with a threaded sleeve on each limb to effect formation of the link. The connecting portions of the sections may have a reduced portion behind the screw to facilitate the interconnection operation and recesses facing inwardly may be provided to transfer the point of maximum deformation from the screw threads of the connecting portion.

---

The present invention relates to a chain joint link of the type which is composed of two curved sections, herein the section limb ends which oppose each other are interconnected by means of nuts which are in screw thread connection with the limb ends. In such links, the screw connection may be made similar to that of a turnbuckle joint, with screw threads of oppositely directed pitches on the two limbs which abut, to the effect that the nut causes the two limb ends to approach and depart, respectively when operated. Section limb ends which are to be joined, may also be provided with screw threads of similarly directed pitches, to the effect that the nuts may be screwed directly from one limb end on to the other. In the first case, the joints have a tendency to unscrew when subjected to vibrations or forces of alternating directions, as the force components acting in a tangential direction along the screw thread ridges of both ends of the nuts are similarly directed. Consequently, it is necessary to lock the nut in one way or another. In the second case, it may easily arrive that the screw thread engagement between the limb ends and the nut are not of equal lengths, to the effect that the strength of the link as a whole is reduced.

Such joints have the great advantage that the nut is automatically locked, even when subjected to vibrations or forces of alternating directions, as the tangential force components are now equal, but oppositely directed.

The object of the present invention is a link of the last mentioned type, wherein the section limbs are joined by pairs by means of a screw thread connection having similar screw thread pitches on the section limbs included in one and the same pair, and wherein the inconveniences referred to are present and wherein, simultaneously, improved strength characteristics are obtained, due to the fact that the link is composed of two curved sections of mutually different curve radii.

Due to the "pear shape" of the link, so obtained, equally distributed screw thread engagements are secured, as an inequality in one link side will prevent the joining of the other side. When equal engagements are once obtained, the same may easily be maintained. For this purpose, one link section limb inwardly of the screw threaded portion may be provided with a portion, the diameter of which is cut down to the core diameter of the screw threads, and of such length that the screw threaded portion and the cut down portion together are of a length at least equal to the length of the corresponding nut. In assembled condition, one section limb then presents a portion of reduced diameter, in which a lock ring or the like may easily be positioned.

If a link of the present type, in which the two sections are of different curve radii, is subjected to tensile load in the direction of length of the link, the distribution of the stress in the link sections is unequal, with a maximum tensile stress near to the ends of the section having the greatest curve radius, i.e. at a point where the sectional area of the section is reduced due to the fact that the section limb ends are provided with screw threads. Consequently by very high tensile loads, there is a danger that deformation may occur and finally a breakage just at these points. According to a further feature of the present invention, this dangerous point is displaced to a portion of the limb in which the sectional area of the limb is of a more favorable shape than at the end of the screw threaded portion, thereby that each of the limbs of the curved section which has the greatest curve radius is provided with a recess on the inwardly facing side of the limb and near to the screw threaded portion of the limb. Due to this recess, the neutral line of the limb sectional area is displaced outwardly towards the outwardly facing side of the section and a substantial increase in the tensile strength of the link is obtained.

The invention is now to be more fully explained, with reference to the accompanying drawings.

Figure 1:
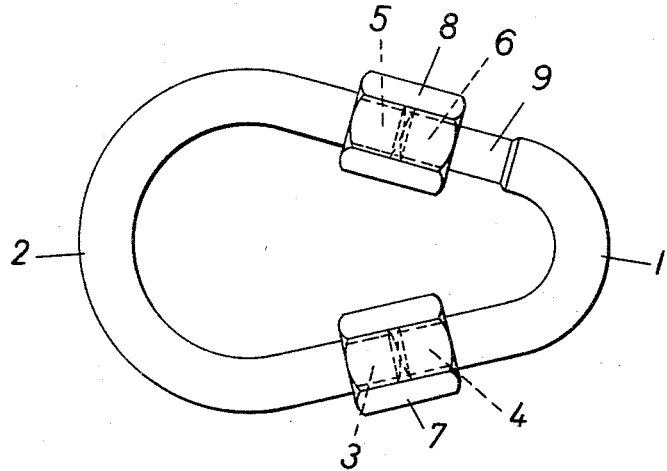
FIGURE 1 is a view of one embodiment of the link according to the invention.

As shown in the drawing, the link is composed of two curved sections 1 and 2, of mutually different curve radii, so that the section 1 is presenting an approximate V shape, whereas the section 2 is of an approximate U shapeshape and the total link is pear shaped. The four ends 3, 4, 5 and 6 of the section limbs are provided with screw threads, which here are of the same pitch direction on the limb ends extending in one and the same line, and the ends 3 and 4, and 5 and 6, respectively are joined by pairs by means of a nut 7 and 8. The lengths of the screw threaded portions 3, 4 and 5 are all approximately equal to one half of the length of the nut concerned, whereas the screw threaded portion 6 is continued by a portion 9, the diameter of which is cut down to the core diameter of the screw threaded portion, as shown in FIG. 1. The sum of the lengths of the portions 6 and 9 is at least equal to the length of the corresponding nut 8, to the effect that the latter may be screwed fully in on the limb 6, when the limbs 5 and 6 are to be joined.

When the link is to be assembled, the nut 7 is at first screwed on to the limb end 4 to one half of the nut length. The nut 8 is then screwed on to the limb end 6 to the entire nut length. The section 3 is then screwed into the nut 7 until abutting against the limb end 4. The section 2 may now be so turned that the limb end 5 is in alignment with the limb end 6, and the nut 8 is unscrewed from the end 6 on to the end 5, one half of the nut length being in screw thread engagement on each of the two limb ends.

Figure 2:
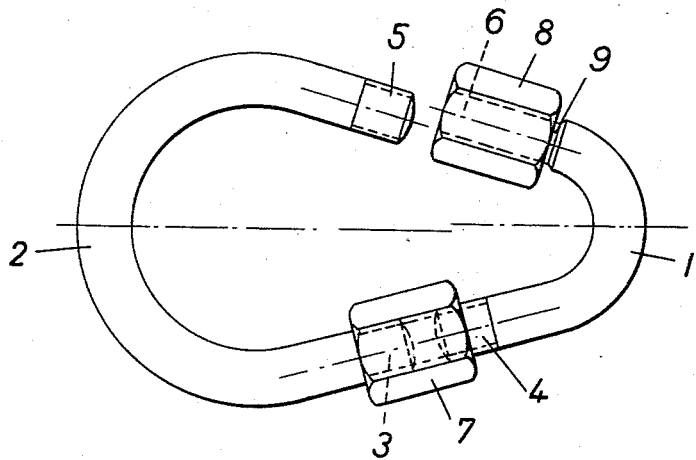
FIGURE 2 illustrates the conditions by an erroneous joining of the link sections.

As shown in FIG. 2, the sections could not be assembled, if the nut 7 is not properly, i.e. equally, entered on both limb ends 3 and 4, as the central lines of the limbs 5 and 6 are displaced relatively to each other, even if they are still in parallel relation. Thus, the pear shape of the link prevents an improper assembly of the link.

Figure 3:
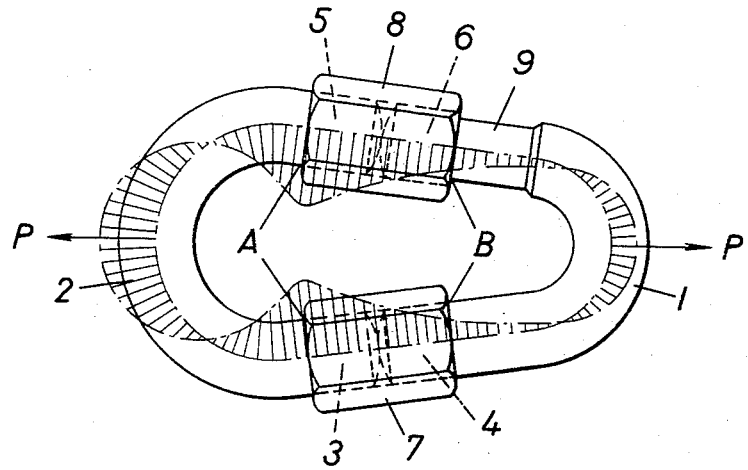
FIGURE 3 is a view similar t othat of FIG. 1, illustrating the tension characteristics.

FIGURE 3 graphically illustrates how the tensile stresses are distributed in the two sections when the assembled link is subjected to a tensile load P. In the largest portion of the link, i.e. in the section 2, an internal maximum tensile stress appears at the point A, i.e. at the point wherein the sectional area of the limb is reduced due to the screw threads. Thus, the core diameter of the screw threaded portions 3 and 5 defines the sectional areas under stress.

If the load P is increased, the width of the link is decreased and the length of the same increased due to the general deformation, but the degree of deformation is always greatest on the inwardly facing side of the section 2 at the points A, at which the sectional area is reduced due to the screw threads, and also most dangerous due to notch effect.

As the load P increases, the degree of deformation at the points A is increased until the deformation strength of the material, i.e. the ductility of the same, is reached and breakage occurs just at the points A. The points B, at the other end of each of the nuts 7 and 8 are not so highly stressed, due to the fact that the link width is greater at A. Consequently, there is no danger of breakage at B before the time when the link, due to the general deformation, has the same width at A and B. The conditions are then equal. However, under all circumstances the deformation strength of the material is firstly surpassed and thereby breakage occurring, at the points A of reduced sectional area and notch effect.

Figure 4:
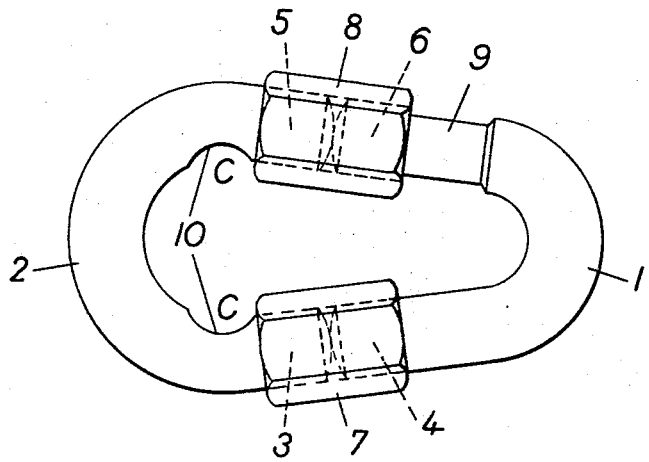
FIGURE 4 is a view of a link to that shown in FIG. 1, wherein, however, one section is so shaped that the tension distribution is improved.

For the purpose of avoiding this danger and in order to increase the breakage strength, the link section 2 is, according to the invention so formed as shown in FIG. 4, by providing an intentional, new place of deformation alongside of A, viz. at C. On the inwardly facing side of the limbs 3 and 5 and adjacent to the ends of the screw threaded portions of the same, each of the limbs is provided with a recess 10 having a curved bottom. Such a reduction of the sectional area at this point causes that a deformation at increasing load, instead of being concentrated at the ends of the screw threaded portions, at the points A, is transferred to the points C at which the shape of the sectional area is by far more favorable as compared with the relatively sharp screw thread bottom at the end of the screw threaded portion, as the recess will cause a displacement in outward direction of the neutral line, to the end of the screw threaded portion and on the interior side of the link, will be positioned at a greater distance from the neutral line than in the case where no recesses are provided, cf. FIGURE 3.

In this way, a substantial increase of the breakage strength of the link is obtained, an increase which may amount to 40 to 50 percent or even more by such a size of the recesses 10 that the sectional area is reduced with about 22 percent.

I claim:

1. An insertable joint link for chains comprising first and second curved sections of mutually different curve radii, each of said sections having two limbs extending generally in the same direction, the cooperating ends of said limbs forming connecting portions, and screw means cooperating with said portions for interconnecting said limbs to thereby resist separation of said sections by forces directed in the plane of said link whereby the ends of the section act against said screw means in a direction toward and away from a center line extending in said plane of said link.

2. The combination of claim 1 wherein each of said screw means includes a sleeve having internal screw threads, each of said connecting portions including external screw threads for engagement with said internal threads, and a reduced portion positioned behind one of said connecting portions having a core diameter substantially equal thereto, the combined lengths of said reduced portion and the adjacent connecting portion being at least equal to the length of said sleeve to facilitate the interconnection operation by allowing positioning of said sleeve entirely thereon.

3. The combination of claim 1 wherein each of the limbs of that curved section having the greater curve radius is provided with a recess on the side facing inwardly and adjacent said screw means whereby to transfer the point of maximum deformation under increasing load away from said screw means.

References Cited
UNITED STATES PATENTS

| 333,095 | 12/1885 | Munro | 59—85 |
| 1,348,248 | 8/1920 | Steinberger | 59—78 |
| 2,538,356 | 1/1951 | Donda | 59—85 |

FOREIGN PATENTS

| 404,008 | 10/1909 | France. |

CHARLES W. LANHAM, *Primary Examiner.*

G. P. CROSBY, *Examiner.*